United States Patent [19]

Quinlan et al.

[11] Patent Number: 5,189,912
[45] Date of Patent: Mar. 2, 1993

[54] ULTRASONIC WHEEL MEASURING APPARATUS AND WHEEL BALANCER INCORPORATING SAME

[75] Inventors: Michael M. Quinlan, Mount Laurence, Ireland; Bernard Jackson, Los Gatos, Calif.; Gordon C. Pacey, Watsonville, Calif.; Willy Borner, Cupertino, Calif.; Brendan O'Sullivan, Castletroy, Ireland; Keith A. Kreft, Cupertino, Calif.

[73] Assignee: Interbalco AG, Switzerland

[21] Appl. No.: 911,355

[22] Filed: Jul. 9, 1992

Related U.S. Application Data

[63] Continuation of Ser. No. 801,582, Dec. 5, 1991, abandoned, which is a continuation of Ser. No. 403,970, Sep. 7, 1989, abandoned.

[30] Foreign Application Priority Data

Sep. 7, 1988 [IE] Ireland ............................. 2694/88
Sep. 9, 1988 [IE] Ireland ............................. 2734/88

[51] Int. Cl.$^5$ ............................................. G01M 1/02
[52] U.S. Cl. .................................... 73/462; 73/597; 73/487
[58] Field of Search .................. 73/462, 468, 487, 597, 73/146; 364/561, 562, 563; 301/5 BA

[56] References Cited

U.S. PATENT DOCUMENTS

| | | | |
|---|---|---|---|
| 3,741,016 | 6/1973 | Hofmann | 73/462 |
| 4,049,954 | 9/1977 | Viera et al. | 73/627 |
| 4,258,567 | 3/1981 | Fisher | 73/146 |
| 4,267,730 | 5/1981 | Curchod et al. | 73/462 |
| 4,341,119 | 7/1982 | Jackson et al. | 73/462 |
| 4,576,044 | 3/1986 | Boni | 73/462 |

FOREIGN PATENT DOCUMENTS

| | | | |
|---|---|---|---|
| 2323139 | 1/1977 | France . | |
| 1215026 | 1/1990 | Italy . | |
| 858285 | 1/1961 | United Kingdom | 73/622 |
| 2139772 | 11/1984 | United Kingdom . | |

*Primary Examiner*—John E. Chapman
*Attorney, Agent, or Firm*—Sughrue, Mion, Zinn, Macpeak & Seas

[57] ABSTRACT

A wheel balancer comprises apparatus for determining the radius of a rim of a hub of a wheel and for determining the distance of the inner and outer side walls of the hub from a reference plane. A framework which is pivotal downwardly over the wheel to be balanced carries a pair of ultrasonic transducers to determine distance of the sides of the wheel from the reference plane. A transducer monitors the position of the framework. The distances monitored by the ultrasonic transducers are stored in a microprocessor against the corresponding positions of the framework at intervals on movement of the framework. The ultrasonic transducers detect a large change in distance from the reference plane caused by the hub well periphery. The hub rim radius is computed from the well periphery radius, while the distances of the side wall from the reference plane is obtained by looking up the stored values of distances which corresponds with the appropriate position of the framework for the hub rim radius.

20 Claims, 5 Drawing Sheets

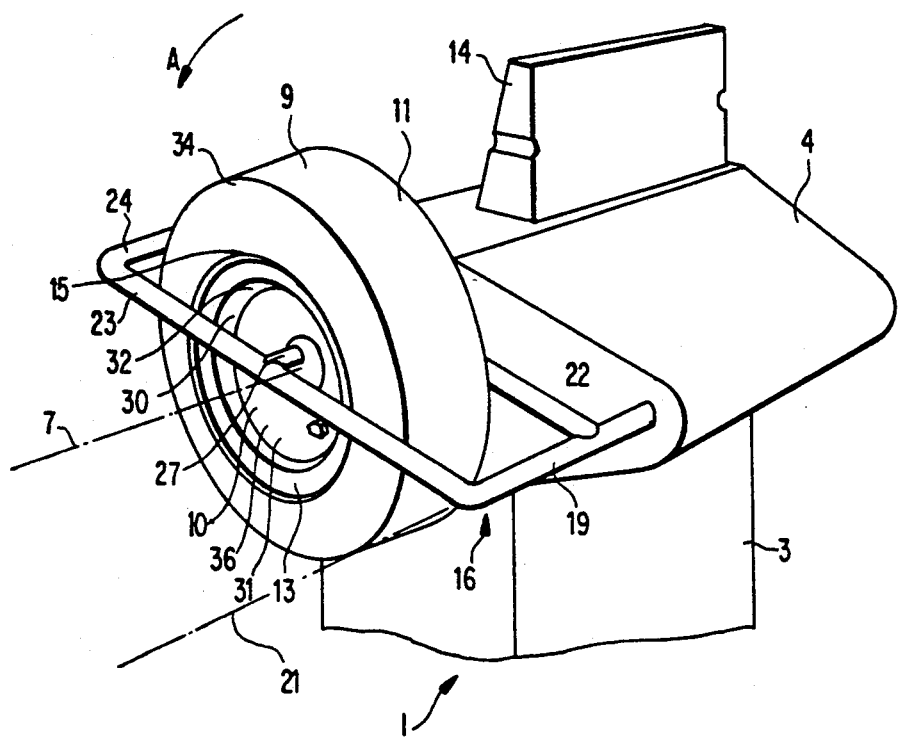
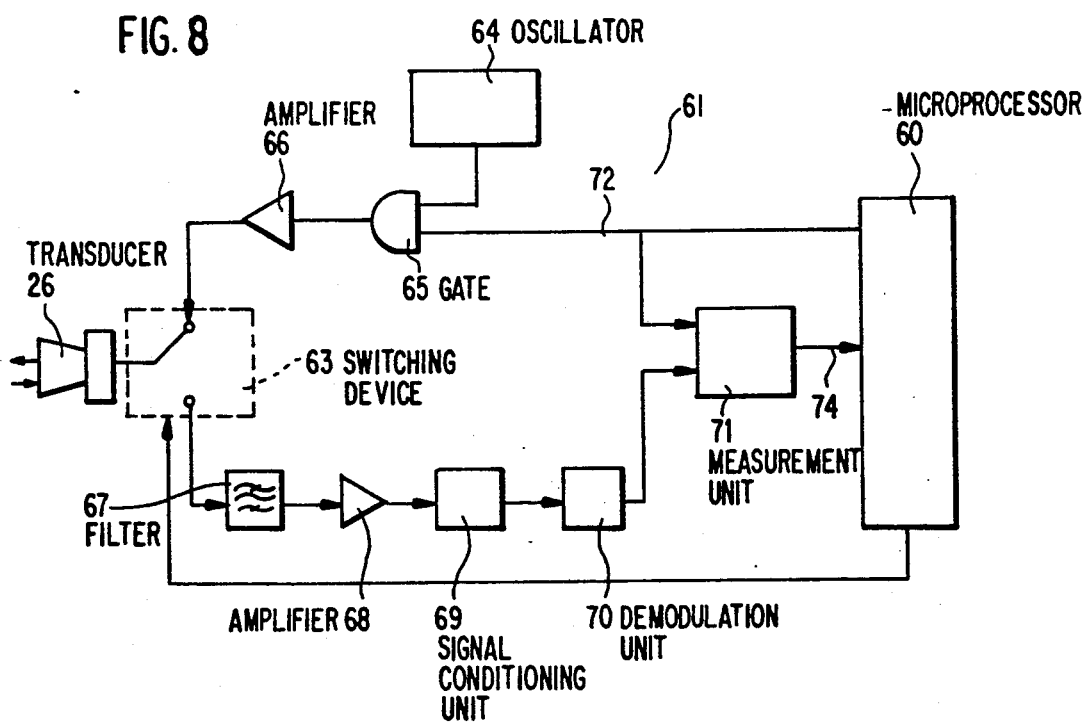

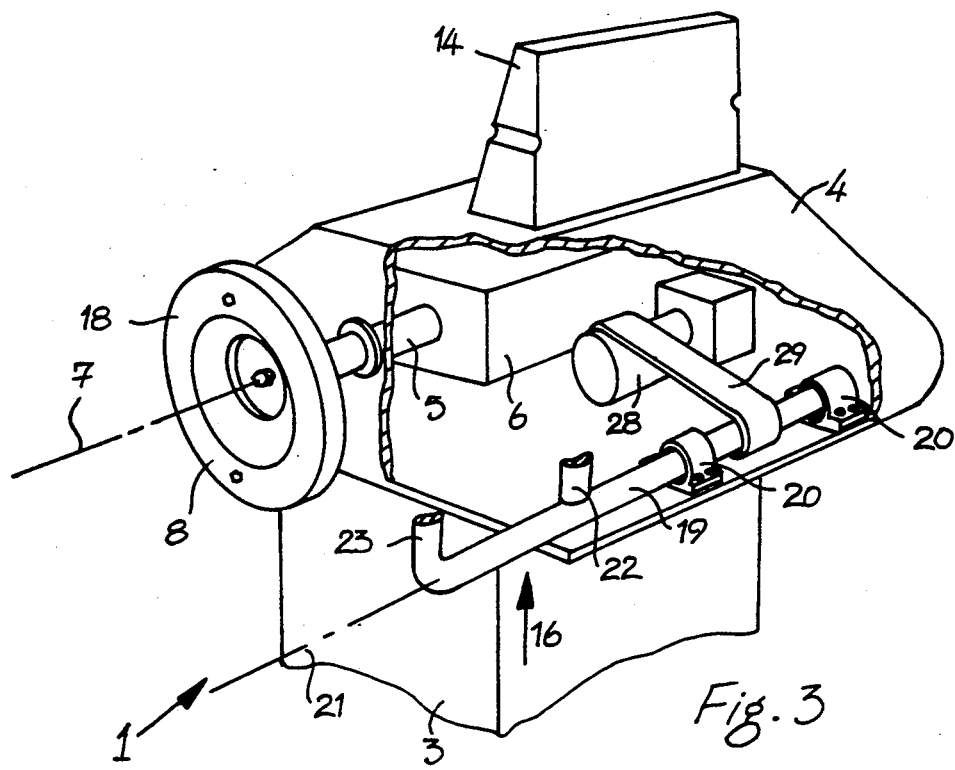
Fig. 3
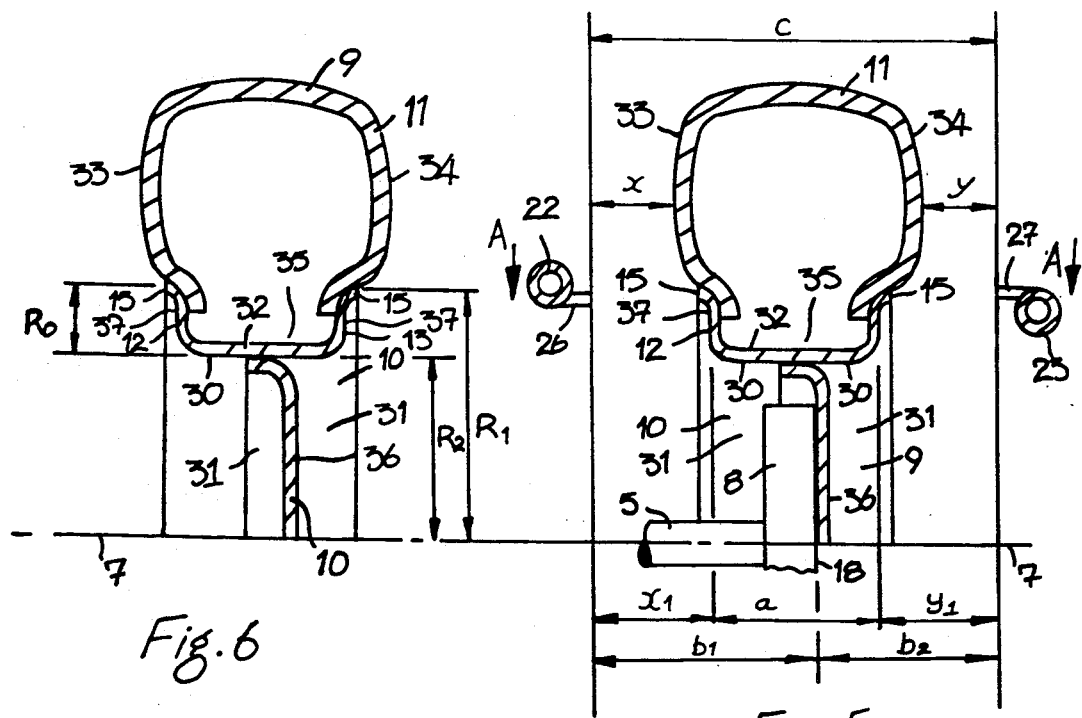
Fig. 6
Fig. 5

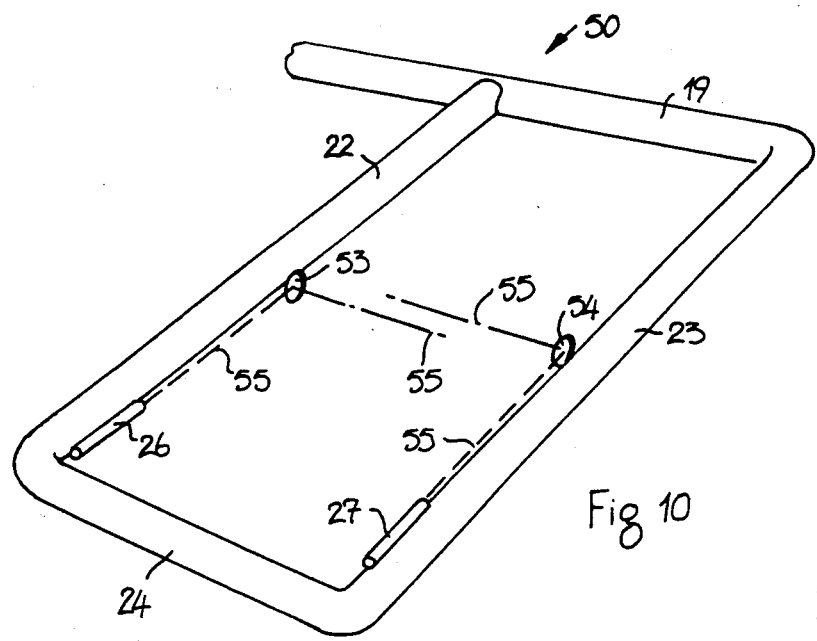
Fig 10
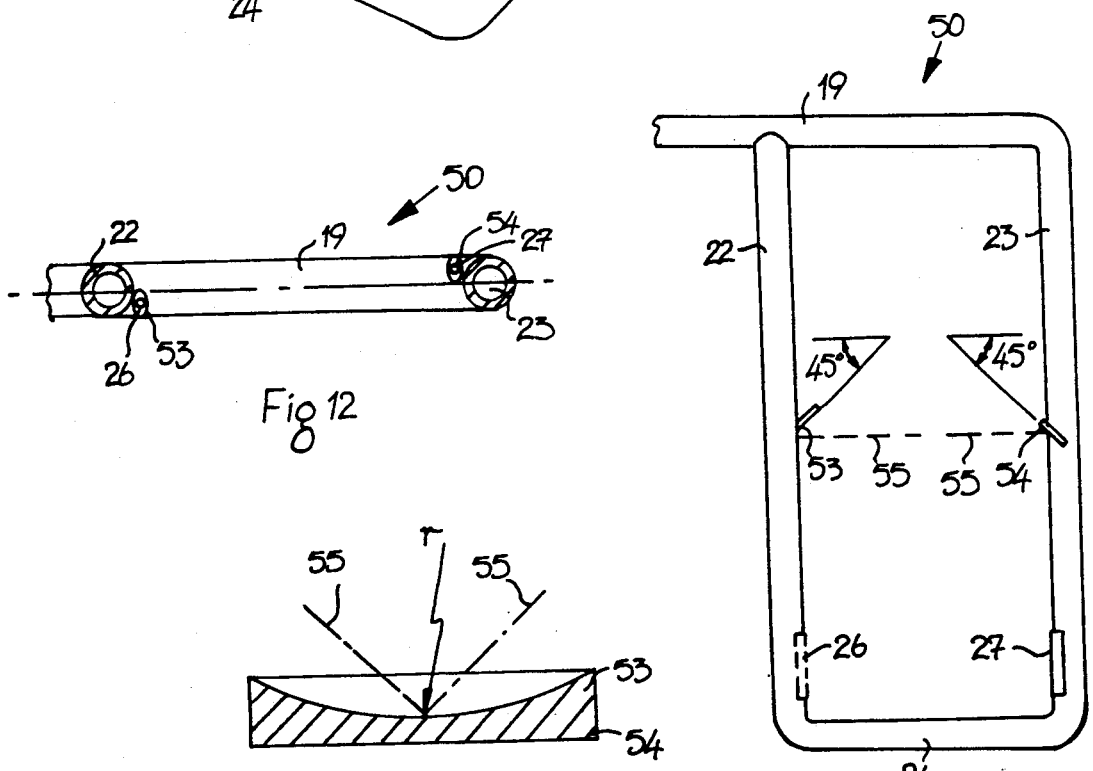
Fig 12
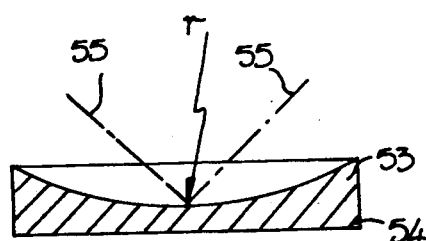
Fig 13
Fig 11

ULTRASONIC WHEEL MEASURING APPARATUS AND WHEEL BALANCER INCORPORATING SAME

This is a continuation of application Ser. No. 07/801,582 filed Dec. 5, 1991, abandoned, which is a continuation of application Ser. No. 07/403,970 filed Sept. 7, 1989, now abandoned.

FIELD OF THE INVENTION

The present invention relates to apparatus and a method for locating a characteristic of a rotatable member and for determining the distance of the characteristic from a reference plane. The invention also relates to apparatus and a method for determining the radius of the characteristic from the rotational axis of the rotatable member. In particular, though not limited the apparatus and method determine the distance or distances of one or two balance weight receiving locations of a vehicle wheel from a reference plane. In general, the method and apparatus determine the radius of the rim of a hub of a vehicle wheel and the distance of the side walls of the hub adjacent the hub rim from a reference plane. The invention also relates to wheel balancing apparatus incorporating the apparatus of the invention.

BACKGROUND OF THE INVENTION

In this specification, the term "vehicle wheel" means a wheel of the type having a hub and a tire mounted on the hub. In general, the hub of such vehicle wheels would be of metal, although not necessarily. Spaced apart side walls extend radially outwardly from a hoop and terminate in a rim. The hoop and side walls form an annular recess for engaging the tire. For convenience, the side walls are referred to as an inner side wall and an outer side wall. The inner side wall is the side wall which in normal use faces inwardly of the vehicle, while the outer side wall faces outwardly of the vehicle. A central plate or spokes are provided within the hoop, and with the hoop form a hub well. The hoop defines the periphery of the well. Such wheels are balanced by attaching one or more balance weights to appropriate balance weight receiving locations. In general, the balance weight locations are provided along the hub rim on the inside and/or outside of the wheel. Such weights attached to the hub rim abut the side wall of the hub adjacent the rim. Alternatively, balance weight receiving locations may be provided at the well periphery and such weights may be secured, for example, by adhesive to the hoop of the hub forming the hub well periphery. Needless to say, it will be appreciated that the apparatus of the invention is not limited to determining parameters of characteristics of such wheels.

Wheel balancing apparatus will be well known to those skilled in the art. Briefly, such wheel balancing apparatus, normally referred to as wheel balancers, comprise a main housing within which is rotatably mounted a wheel support shaft. A wheel to be balanced is mounted fast on the support shaft, which is then rotated. The support shaft may be rotated by a drive motor, or alternatively by hand, depending on the particular type of balancing apparatus. Transducers are provided associated with the support shaft and mountings of the shaft for sensing stresses and strains in the shaft and mountings for in turn determining the out of balance moment of the wheel and the angle through which it acts.

In general, wheel balancers are microprocessor controlled, and they present the data necessary for balancing the wheel on a visual display. Usually the data displayed is the size of the balance weight required to correct the wheel imbalance and the angular position at which it should be mounted on the rim of the hub of the vehicle wheel, where the balance weight is to be hub mounted. Normally, wheel balancers give this information for the inside and outside of the hub rim. So that the size of weight required to correct the imbalance can be correctly determined, it is necessary for the peripheral diameter of the hub rim to be inputted into the microprocessor. It will be readily appreciated by those skilled in the art that the greater the hub rim diameter, the smaller the weight necessary to correct a given imbalance. Further, in most cases, it is necessary to know the distance of either or both the inside and outside side walls of the hub adjacent the rim from a reference plane of the balancer to enable the values of the inner and outer weights to be determined. In general, the distance of the inside side wall from the reference plane and the width of the hub across the side walls adjacent the hub rim is required. Thus, it is necessary for an operator of the wheel balancer to input, generally through a keyboard or by setting programming knobs, the peripheral diameter of the hub rim which is being balanced and the width of the hub across the side walls adjacent the hub rim, and the distance of the inside side wall from the reference plane. Needless to say, where the balance weights are to be affixed to the hub at other locations besides the rim, the radius of these locations and their distances from the reference plane must likewise be entered into the balancer.

Unfortunately, this presents a considerable number of problems, the most serious of which is the possibility of the operator entering the wrong values of these characteristics of the wheel, and of the wheel relative to the wheel balancer. Should a wrong rim diameter be entered, it will be appreciated that while the angular position at which the weight is to be attached, in general, will not be affected, the weight value displayed by the wheel balancer will be incorrect. This, accordingly, will lead to an ill-balanced wheel, which indeed may exhibit imbalance characteristics worse than before it was allegedly balanced. This, therefore, is undesirable. Similarly, more serious difficulties arise if an incorrect value of the other characteristics are entered. In these cases, even the angular positions could be affected.

Attempts to overcome these problems have been made, however, in general, these attempts suffer from a number of disadvantages. In general, such attempts have involved providing a wheel balancer with a device mounted on the wheel balancer to enable the radius of the hub rim and the width of the hub adjacent the rim as well as the distance of the inside and outside side walls of the hub adjacent the rim from a reference plane of the wheel balancer to be entered automatically in the wheel balancer. In general, such devices comprise a feeler member which is mounted on the housing of the wheel balancer and is movable so that an end of the feeler member engages the hub rim. A potentiometer or potentiometers on the feeler member transmit an electrical signal proportional to the distance moved by the feeler member to suitable electronic circuitry. The circuitry computes the rim radius and width as well as distance from the reference plane from the transmitted signals.

These devices have, in general, suffered from disadvantages. In particular, they do not eliminate operator error, and furthermore, they are relatively labor intensive. It is believed that one of the main reasons for these disadvantages is the fact that the feeler member must accurately engage the inside and/or outside rim of the hub in order for the necessary dimensions to be accurately computed by the electronic circuitry. Needless to say, if the feeler member does not correctly engage the hub rim, the signals transmitted by the potentiometer will be incorrect. In practice, it has been found that it is quite difficult for an operator of a wheel balancer to correctly locate the feeler member on the hub rim. In many cases, the inside rim may be relatively inaccessible to an operator due to the construction of the housing of the wheel balancer. Dirt on the hub rim or a slightly damaged hub rim also affects the accuracy of the results. Further, hub rims may be provided with a number of steps, and the operator may engage one of the steps adjacent the hub rim rather than the actual hub rim itself. A further problem with these devices is the fact that because they are essentially mechanically operated, they can wear relatively easily, thus causing backlash, which in turn leads to inaccurate results.

Typical examples of wheel balancers with devices for automatically inputting the hub rim radius and width and the distance of the rim from a reference plane are disclosed in British Patent Specification No. 2,130,386, U.S. Pat. No. 3,741,016 and British Patent Specification No. 2,139,772.

The wheel balancer disclosed in British Patent Specification No. 2,130,386 comprises a device for determining the radius of the inner hub rim only and its distance from a reference plane. The device comprises a feeler member, one end of which is adapted for engaging the inner hub rim, and the other end is mounted on a shaft rotatable in mountings mounted on the wheel balancer housing. The shaft is mounted parallel to the rotational axis of the wheel support shaft and is also slidable longitudinally in the rotatable mountings. The feeler member and shaft are moved outwardly of the housing towards the wheel and the feeler member and shaft are pivoted until the feeler member engages the inner rim of the wheel. A potentiometer is connected to the shaft to monitor the longitudinal distance moved by the shaft when the feeler member is being brought into engagement with the hub rim to determine the distance of the hub rim from the reference plane and a second potentiometer is connected to the shaft to monitor the angular rotation of the shaft caused by pivoting the feeler member and shaft relative to the mountings to engage the rim. Signals from the two potentiometers are transmitted to suitable electronic circuitry for computing the radius of the inner rim and its distance from a reference plane.

U.S. Pat. No. 3,741,016 discloses a wheel balancer with a device for determining the radius of the inner hub rim of the wheel and its distance from a reference plane which is substantially similar to the device of British Patent Specification No. 2,130,386. However, in the case of the device of the U.S. specification, an additional feeler member is provided for determining the distance of the outer hub rim of the wheel from the reference plane so that the width of the hub adjacent the rim may be computed.

British Patent Specification No. 2,139,772 discloses a wheel balancer with a device for determining the radius and width of a hub rim. This device operates on a substantially similar principle to the device of British Patent Specification No. 2,130,386 with the exception that the shaft on which the feeler member is mounted is arranged in such a way that the shaft and feeler member may be moved outwardly of the wheel so that the feeler member is engagable with both the inner and outer hub rims for determining the width of the hub adjacent the rim as well as the radius of the rim.

However, in all cases, these devices require the use of a feeler member which must be positively and accurately engaged on the wheel rim. Thus, it will be appreciated by those skilled in the art that all these devices suffer from the disadvantages already discussed.

There is therefore a need for a wheel balancer which comprises an apparatus and method for determining the radius of one or more balance weight receiving locations of a vehicle wheel and for determining the distance of each balance weight receiving location from a reference plane. In particular, there is a need for a wheel balancer which comprises an apparatus and method for determining the radius of the rim of a hub of a wheel and for determining the distance of a side wall of the hub adjacent the rim from a reference plane. Furthermore, there is a need for an apparatus and method for locating a characteristic of a rotatable member and determining the distance of the characteristic from a reference plane.

OBJECTS OF THE INVENTION

One object of the invention is to provide an apparatus for locating a characteristic of a rotatable member and for determining the distance of the characteristic from a reference plane. It is further an object of the invention to provide such an apparatus for determining the radius of a characteristic of the rotatable member and the distance of the characteristic from the reference plane without having to rely on the ability of an operator to carry out specific tasks accurately.

A further object of the invention is to provide a method for locating a characteristic of a rotatable member and for determining the distance of the rotatable member from a reference plane.

A further object of the invention is to provide apparatus for determining the radius of a balance weight receiving location of a hub of a wheel, and also for determining the distance of the balance weight receiving location from a reference plane.

Another object of the invention is to provide apparatus for determining the radius of the rim of a hub of a wheel and also for determining the distance of the inside and outside sides of the hub adjacent the hub rim from a reference plane.

A still further object of the invention is to provide wheel balancing apparatus which comprises apparatus for determining the radius of a balance weight receiving location of a hub of a wheel and for determining the distance of the location from a reference plane and for inputting this data into the wheel balancing apparatus.

A further object of the invention is to provide wheel balancing apparatus which comprises apparatus for determining the radius of the rim of a hub of a vehicle wheel and also for determining the distance of the inside and outside sides of the hub adjacent the hub rim from a reference plane. A further object of the invention is to provide wheel balancing apparatus with such apparatus for determining the radius of a rim of a hub of a wheel and also for determining the distance of the inner and/or outer sides of the hub adjacent the rim from a reference plane of the wheel balancer, and for inputting this data directly into the wheel balancing apparatus.

It is also an object of the invention to provide a method for determining the radius of a rim of a hub of a vehicle wheel and for determining the distance of the sides of the hub adjacent the rim from a reference plane when mounted on a wheel balancer. A further object of the invention is to provide a method for determining the distance of the inner and/or outer sides of the hub adjacent the rim from a reference plane of the wheel balancer.

SUMMARY OF THE INVENTION

According to the invention, there is provided apparatus for locating a characteristic of a rotatable member, and for determining the distance of the characteristic from a reference plane, the apparatus comprising:
  a housing,
  receiving means mounted on the housing for receiving the rotatable member, the receiving means defining the rotational axis of the rotatable member,
  a mounting means movable relative to the housing,
  sensing means for transmitting and receiving a signal for detecting the rotatable member and the characteristic, the sensing means being mounted on the mounting means so that on movement of the mounting means relative to the housing the signal of the sensing means moves over portion of a side of the rotatable member,
  detecting means for detecting the position of the mounting means relative to the housing, and
  computing means for computing the distance of the characteristic from the reference plane from signals received from the sensing means and the detecting means.

Preferably, the computing means computes the radial distance of the characteristic from the rotational axis of the rotatable member from signals received from the sensing means and the detecting means.

In one embodiment of the invention, the sensing means is mounted on the mounting means for transmitting the signal towards a side of the rotational member from a predetermined position and at a predetermined direction relative to the mounting means, and the mounting means is constrained to move along a predetermined path relative to the housing.

In another embodiment of the invention, a pair of sensing means are provided, the sensing means being mounted on the mounting means so that on movement of the mounting means the signals of the sensing means move over portion of respective opposite sides of the rotatable member.

In another embodiment of the invention, the computing means comprises storing means for storing distances of each side of the rotatable member from a reference plane against corresponding positions of the mounting means at predetermined intervals on movement of the mounting means.

In one embodiment of the invention, the detecting means comprises a transducer for monitoring the position of the mounting means, and each sensing means is provided by an ultrasonic sensor having an ultrasonic transmitter and receiver contained therein.

Advantageously, the mounting means is provided by a framework having a pair of spaced apart side members, which in use receive portion of the rotatable member therebetween, the predetermined position and direction of the signal of the sensing means being relative to respective side members of the framework.

In a further embodiment of the invention, the predetermined positions from which the signal of the sensing means are transmitted are provided on respective side members substantially opposing each other, the predetermined direction of each signal being substantially parallel to the rotational axis of the rotatable member, the framework being movable so that the predetermined positions move in a substantially radial direction towards the rotational axis of the rotatable member.

Preferably, one predetermined position is slightly advanced of the other predetermined position in the direction of motion of the framework towards the rotational axis of the rotatable member.

Advantageously, the mounting means is pivotally mounted about a pivot axis, the pivot axis being parallel to and spaced apart from the rotational axis of the rotatable member, the pivot axis and rotational axis together defining a common plane.

In one embodiment of the invention, the apparatus is for locating a characteristic of a hub of a vehicle wheel and for determining the distance of the characteristic from the reference plane, the computing means comprising means for storing reference parameters of reference vehicle wheels, and means for computing corresponding parameters of the vehicle wheel from the signals received by the sensing means and detecting means, and means for comparing the parameters of the vehicle wheel with the reference parameters of known vehicle wheels.

Advantageously, the computing means computes the radial distance of a balance weight receiving location from the rotational axis of the vehicle wheel and the distance of the balance weight receiving location from the reference plane.

In a further embodiment of the invention, the means for storing reference parameters of reference vehicle wheels stores the cross sectional profile of at least portion of the reference vehicle wheels, and the computing means comprises means for computing a profile of portion of the vehicle wheel and comparing it with the reference profiles for determining at least the radius of the balance weight receiving location of the vehicle wheel.

Alternatively, each sensing means detects the periphery of the well of the hub, and the computing means stores distances of the surfaces of the radial sides of the vehicle wheel against corresponding values of radii at intervals on movement of the mounting means, and the computing means comprises means for computing the radius of the periphery of the well of the hub from the signals received from the sensing means and the detecting means, and means for adding a predetermined distance to the computed value of the radius of the periphery of the well for determining the radius of the balance weight receiving location, and means for looking up a stored value of distance of the surface of the or each radial side of the vehicle wheel from the reference plane, corresponding to the radius of the balance weight receiving location.

In one embodiment of the invention, the radius and distance of balance weight receiving locations on each side of the wheel are determined, the radius of each balance weight receiving location being the radius of the rim of the hub and the distance of each balance weight receiving location being the distance of a respective side wall of the hub adjacent the rim from the reference plane.

Additionally, the invention provides wheel balancing apparatus comprising the apparatus according to the invention, the wheel balancing apparatus comprising a housing which forms the housing of the apparatus, and the receiving means for receiving the rotatable member being provided by a shaft rotatable in the housing and defining the rotational axis of the wheel, the computing means also comprising means for determining the imbalance of the wheel.

Further, the invention provides a method for locating a characteristic of a rotatable member and for determining the distance of the characteristic from a reference plane, using the apparatus according to the invention, the method comprising the steps of:
- mounting the rotatable member on the receiving means,
- moving the mounting means relative to the housing to cause the signal from the sensing means to move over a side of the rotatable member for detecting the characteristic, and
- computing the distance of the characteristic from the reference plane from signals received from the sensing means and the detecting means.

Further, the invention provides a method for determining the radius of a balance weight receiving location of a vehicle wheel from the rotational axis of the wheel and for determining the distance of the balance weight receiving location from a reference plane, using the apparatus according to the invention, the method comprising the steps of:
- moving the mounting means so that the signals of the sensing means move over at least portion of the radial sides of the wheel,
- recording and storing the distances of the surfaces of portion of each radial side of the wheel from the reference plane against the corresponding positions of the mounting means at a plurality of different positions of the framework at intervals as the framework is moved,
- comparing some of the stored values against reference parameters of reference wheels for determining the type of wheel, and
- determining the radius of the balance weight receiving location and the distance of the location from the reference plane from at least some of the stored values.

In one embodiment of the invention, the method includes computing a profile of a cross section of at least portion of the wheel and comparing the profile with reference profiles of reference wheels to determine the type of wheel, each profile comprising a profile of a section of the wheel hub adjacent the well periphery of the hub, and the radius of two balance weight receiving locations and distances of two balance weight receiving locations are computed.

Alternatively, the method further comprises the step of computing the radius of the periphery of the hub well from signals received from the sensing means and detecting means on one or both of the sensing means detecting a relatively large change in distance of the outer surface of a side of the hub from the reference plane, adding a predetermined distance corresponding to the difference between the rim radius of the hub and the well peripheral radius to the well peripheral radius to provide the radius of the hub rim, looking up the stored values of the distances of the surfaces of the radial sides of the wheel from the reference plane corresponding to a radius of the side wall adjacent the hub rim.

ADVANTAGES OF THE INVENTION

The advantages of the invention are many. Where the apparatus according to the invention is mounted on a wheel balancer and is used for determining the radius of a balance weight receiving location of a wheel and the distance of the balance weight receiving location from a reference plane, and where the apparatus is connected to the wheel balancing apparatus, a particularly important advantage is achieved. By virtue of the fact that the output from the apparatus is inputted directly into the wheel balancing apparatus, any danger of spurious data being entered into the wheel balancing apparatus is avoided. Further, where the apparatus determines the radius of the rim of a hub of a wheel and the distance of the inside and outside side walls of the hub adjacent the hub rim from a reference plane of the wheel balancer, and this data is inputted directly into the wheel balancing apparatus, similar advantages are achieved. In particular, particularly accurate results are entered into the wheel balancer, and accordingly the value of the balance weight and its angular position can be more accurately determined by the wheel balancer. Further, by virtue of the fact that the data from the apparatus is inputted directly into the wheel balancer, the possibility of operator error is eliminated. Furthermore, by virtue of the fact that the sensing means do not physically have to engage any part of the wheel, the need for an operator to relatively skillfully engage a feeler member on the hub rim of the wheel has been eliminated.

Needless to say, where the apparatus is used for determining the radius of a characteristic of a rotatable member, it provides particularly accurate results of the radius. Further, the apparatus also provides a relatively accurate result when it is used for determining the distance of a rotatable member from a reference plane.

A further advantage of the invention is that the labor content required to operate balancers known heretofore is substantially reduced by using the apparatus of the invention.

The advantages of using the method of the invention are accordingly similar to those achieved from the apparatus.

These and other advantages and objects of the invention will be readily apparent to those skilled in the art from the following description of some preferred embodiments thereof, given by way of example only, with reference to the drawings.

BRIEF DESCRIPTION OF THE DRAWINGS

FIG. 2 is a perspective view of the wheel balancing apparatus of FIG. 1 with portion of the apparatus in a different position, FIG. 3 is a partly cut-away perspective view of the wheel balancing apparatus of FIG. 1, FIG. 5 is a cross sectional view of portion of a vehicle wheel illustrated mounted on portion of the apparatus of FIG. 1, FIG. 6 is a further cross sectional view of portion of the vehicle wheel of FIG. 5, FIG. 8 is a logic block diagram of part of the apparatus of FIG. 1, FIG. 10 is a perspective view of apparatus according to another embodiment of the invention, FIG. 11 is a plan view of the apparatus of FIG. 10, FIG. 12 is a sectional end view of the apparatus of FIG. 10, and FIG. 13 is a sectional view of a detail of the apparatus of FIG. 10.

DETAILED DESCRIPTION OF THE INVENTION

Figure 1:
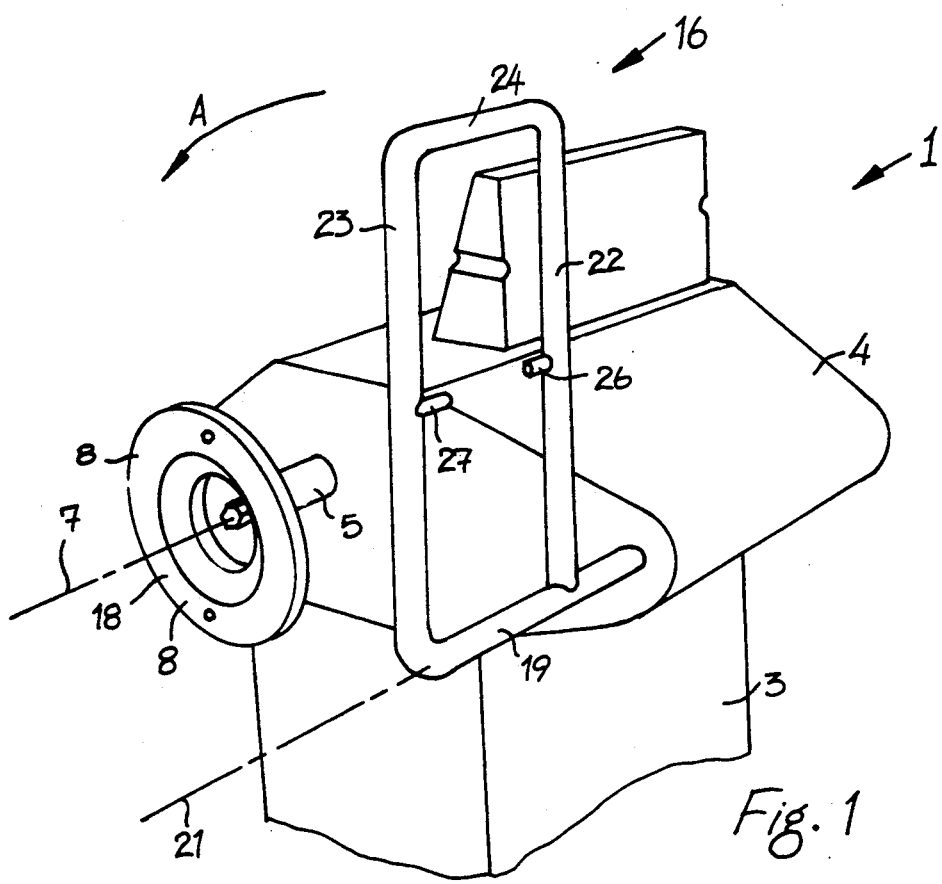
FIG. 1 is a perspective view of wheel balancing apparatus according to the invention.

Referring to the drawings and initially to FIGS. 1 to 8, there is illustrated wheel balancing apparatus, namely a wheel balancer according to the invention indicated generally by the reference numeral 1. The wheel balancer 1 comprises a ground engaging pedestal 3 portion of which is illustrated. A housing 4 is supported on the pedestal 3. A receiving means for receiving a rotatable member to be balanced namely a vehicle wheel 9 is provided by a wheel support shaft 5 rotatable about its central axis 7. The wheel support shaft 5 is rotatably mounted in a sub-housing 6 within the housing 4. A coupling plate 8 fast on the shaft 5 receives a wheel 9 for balancing so that the rotational axis of the wheel is co-axial with the rotational axis 7 of the shaft 5. Suitable transducers (not shown) are mounted within the sub-housing 6 for sensing stresses and strains in the shaft 5 for determining the out of balance moment of the wheel 9 when it is rotated, see FIG. 3. The transducers (not shown) relay the monitored values to a microprocessor 60 in the wheel balancer 1 which determines the weights and their angular positions required on the inside and outside of the wheel 9 to correct the imbalance. A visual display 14 in the housing 4 displays the size of the weights and their angular positions. This aspect of the electronic circuitry for determining the size of the weights and their angular position is not described in further detail, since it will be well known to those skilled in the art. The microprocessor 60 is illustrated in FIG. 8 which is described below. The wheel balancer 1 is of the type in which the wheel 9 and shaft 5 are rotated by hand, namely of the type disclosed in British Patent Specification No. 2,131,561B and will be well known to those skilled in the art.

The wheel 9 comprises a hub 10 and tire 11 mounted on the hub 10. An inside side wall 12 and an outside side wall 13 extend from a hoop 32 and form with the hoop 32 an annular recess 35 for receiving the tire 11. The side walls 12 and 13 terminate in rims 15. A centre plate 36 within the hoop 32 forms a well 31 and defines a periphery 30 of the well 31. For convenience, the inside radial face of the wheel 9 is indicated by the reference numeral 33 and the outside radial face of the wheel is indicated by the reference numeral 34. Balancing weights for correcting the imbalance in the wheel are secured to suitable balance weight receiving locations on the wheel hub. In the wheel 9 illustrated in FIGS. 1 to 8, the balance weights, in general, are clipped on to the rim 15 of either or both the inside wall 12 and the outside wall 13 and in practice the weights abut tightly against outer surfaces 37 of the side walls 12 and 13. Thus, to determine the value and angular position of a balancing weight or weights required to correct imbalance forces in the wheel 9, it is necessary to know the radius of the rim 15 of the side walls 12 and 13 and the distances of the outer surfaces 37 of the side walls adjacent the rim 15 from a reference plane described below in the wheel balancer 1. In wheels of other construction, where it is not convenient to attach balance weights to the hub rim, for example, in the case of aluminium and-/or alloy wheels, other balance weight receiving locations besides the wheel rim are used. Typically, balance weights may be secured to the periphery of the hub well formed by the hoop 32. In such cases, the balance weights are secured by adhesive to the hoop 32, generally a balance weight, if necessary, is provided on each side of the centre plate 36. Needless to say, other suitable balance weight receiving locations could be used without departing from the scope of the invention.

Apparatus according to the invention for determining the radius of a characteristic of a rotatable member from the rotational axis of the rotatable member is indicated generally by the reference numeral 16 and is mounted in the housing 4. In this embodiment of the invention, the apparatus determines the radius of a balance weight receiving location of the wheel 9 from the rotational axis 7 of the shaft 5. In this particular case, since the balance weight is to be attached to the rim 15 of the hub 10, and thus the balance weight receiving location is adjacent the rim 15 of the hub 10, the apparatus determines the radius of the rim 15 from the rotational axis 7. The radius of the rim 15 from the rotational axis 7 of the shaft 5 is referred to as the radius $R_1$, see FIG. 6. The apparatus 16 also determines the distance of the characteristic, namely, the balance weight receiving location from a reference plane. Since in this case the balance weights are to be clipped onto the rim 15 and abut the side walls 12 and 13, the apparatus determines the distance of the outer surfaces 37 of the inside side wall 12 and the outside side wall 13 of the hub 10 adjacent the rim 15 from the reference plane of the wheel balancer. In this embodiment of the invention, the reference plane is a face 18 of the coupling plate 8. The width of the hub between the outer surfaces 37 of the side walls 12 and 13 adjacent the rim 15 is also determined. This width of the hub 10 adjacent the rim 15 is referred to as a, see FIG. 5.

The apparatus 16 comprises a mounting means provided by a framework 17, which in constrained to move in a predetermined path relative to the housing. In this case, the framework 17 pivots in a predetermined path relative to the housing. The framework 17 comprises a main pivot member 19 which is pivotally mounted in the housing 4 by bearings 20 and which defines a pivot axis 21. The pivot member 19 and bearings 20 are so arranged that longitudinal sliding of the pivot shaft 19 relative to the housing 4 is prevented. A pair of side members 22 and 23 in a common plane extend radially from the pivot member 19 to, in use, pass on each side over portion of the radial sides 33 and 34 of the wheel 9 as the framework 17 is pivoted about its pivot axis 21. A cross member 24 joins the side members 22 and 23.

The pivot axis 21 of the pivot member 19 is parallel to the rotational axis 7 of the shaft 5. Further, the two axes 7 and 21 define a common plane and are spaced apart from each other a distance greater than the maximum radius of the largest wheel 9 to be balanced. This can clearly be seen in FIG. 2. Accordingly, when the wheel 9 is mounted on the coupling plate 8 of the wheel balancer 1, the framework 17 can be provided downwardly over the wheel 9 in the direction of the arrow A.

A pair of sensing means, namely ultrasonic transducers 26 and 27 are mounted on the side members 22 and 23 for scanning respective radial sides 33 and 34 of the wheel 9 for detecting a characteristic of the wheel 9, in this case for detecting the periphery 30 of the wheel well 31 of the hub 10 as will be described below. Each ultrasonic transducer 26 and 27 comprises an ultrasonic transmitter and receiver, neither of which are illustrated. The transmitter and receiver of the transducers 26 and 27 direct and receive signals towards the sides 33 and 34 respectively of the wheel 9 from predetermined positions relative to the framework and in predetermined directions. In this case, the predetermined positions as can be seen are the positions of the transducers 26 and 27 on the side members 22 and 23 of the framework 17. In this case, the signals are directed in a predetermined direction which is parallel to the rotational axis 7 of the shaft 5. In other words, the signal from each transmitter strikes the wheel 9 substantially perpendicularly to the plane of the face 18 of the coupling plate 8. Thus, the output signal from the transducers 26 and 27 are proportional to their distances from the surfaces of the respective sides 33 and 34 of the wheel 9. In this case, the distance of the transducer 26 from the side 33 of the wheel 9 is referred to as distance x, while the corresponding distance of the transducer 27 from the side 34 is referred to as the distance y, see FIG. 5. The distance of the transducer 26 from the reference plane 18 is referred to as $b_1$ and the distance of the transducer 27 from the reference plane 18 is referred to as $b_2$, see FIG. 5. Accordingly, the distance of any point on the surface of the inside 33 of the wheel 9 from the reference plane 18 is $$b_1 - x,$$

and the distance from any point on the surface of the outside 34 of the wheel 9 from the reference plane 18 is $$b_2 - y,$$

$b_1$ and $b_2$ being known.

Furthermore, the width of any portion of the wheel 9 is $$c - x - y$$

where c is the distance between the transducers 26 and 27 which in this case is 60 mm, see FIG. 5.

Figure 7:
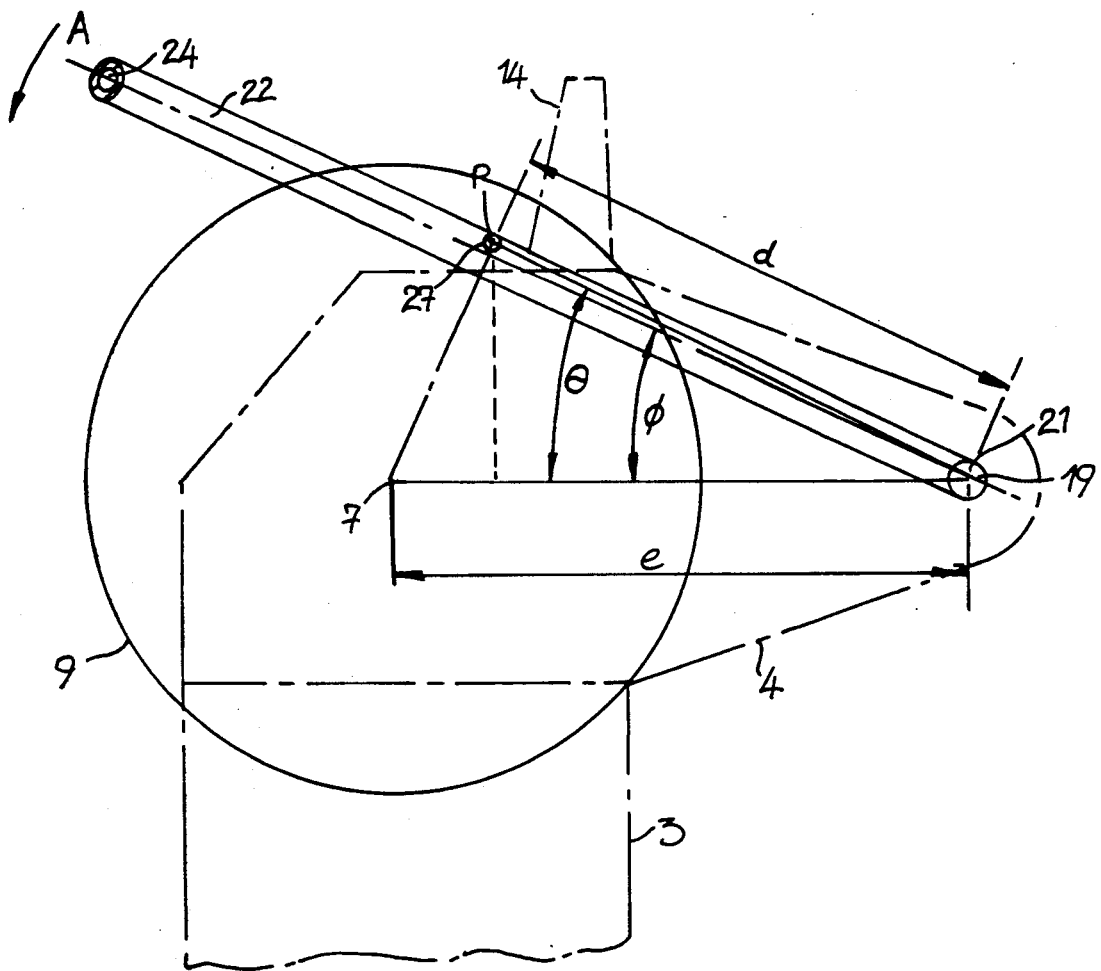
FIG. 7 is a schematic representation of portion of the apparatus of FIG. 1 illustrating how computations are carried out by the apparatus.
Figure 4:
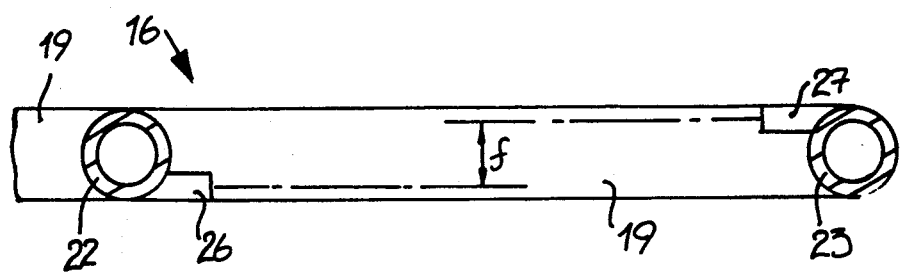
FIG. 4 is a cross sectional view of a detail of the apparatus of FIG. 1.

The ultrasonic transducers 26 and 27 are mounted on the framework 17 at a distance d from the pivot axis 21 which is substantially equal to the distance e between the rotational axis 7 and the pivot axis 21, see FIG. 7. Thus, as the framework 17 is pivoted, the transducers 26 and 27 move substantially radially towards or away from the rotational axis 7 of the shaft 5. The ultrasonic transducers 26 and 27 while they are directed towards each other are not totally aligned with each other, the transducer 26 is advanced a distance f of the transducer 27 in the direction of motion of the framework 17 as it pivots towards the rotational axis 7, see FIG. 4. In this case, the distance f is 10 mm. In other words, the angle which the ultrasonic transducer 26 defines with the common plane of the axes 7 and 21 about the pivot axis 21 is always slightly less than the equivalent angle of the ultrasonic transducer 27 for any given position of the framework 17. This enables the transducer 27 to confirm certain readings made by the transducer 26 as will be described below.

Detecting means for detecting the angular position of the framework 7 about its axis 21 relative to the common plane of the axes 7 and 21 and in turn for detecting the angular position of the transducers 26 and 27 is provided by a rotary type potentiometer transducer 28 connected to the pivot member 19 by a semi-rigid band 29. In this case, the gear ratio between the transducer 28 and the pivot shaft 19 is 2:1 and accordingly the electrical output from the transducer 28 is proportional to $$\frac{K\phi}{2}$$

where
K is a constant of the transducer 28, and
$\phi$ is the angle which the framework 17 makes with the common plane defined by the axes 7 and 21 about the axis 21, see FIG. 7.
This is described in more detail below.

Signals from the ultrasonic transducers 26 and 27 and the transducer 28 are fed into computing means, which is provided by the microprocessor 60 of the wheel balancer 1 through circuitry which is described below. Suitable software is provided in the microprocessor 60 for operating on the signals from the transducers 26, 27 and 28. As the framework 27 is pivoted downwardly in the direction of arrow A from the position illustrated in FIG. 1 over the wheel 9, the signals from the transducers 26, 27 and 28 are read and stored in storing means provided by memory in the microprocessor 60. In this case, a set of readings is taken at every 2° interval of movement of the framework 17 with the common plane of the axes 7 and 21. In other words, a reading is taken for every 2° change in the angle $\phi$. The read values of distances x and y from the transducers 26 and 27 respectively are stored against the corresponding angular position $\phi$ of the framework read from the transducer 28.

It has been found in general that it is relatively difficult unless one uses relatively sophisticated ultrasonic transducers and electronic monitoring apparatus to determine precisely the position of the hub rim 15. The reason for this is because of the relatively small variation in the values of x and y as the transducer 26 and 27 pass from the wall of the tire 11 over the rim 15. Thus, in this case suitable software is provided for detecting a sudden relatively large change in the values of x and y which thus indicates the position of the periphery 30 of the hub well 31. In this case, the radius of the periphery 30 of the hub well 31 is referred to as $R_2$. The radial distance between the rim 15 and the hub well periphery 30 is referred to as $R_0$, see FIG. 6. The value of $R_0$ is constant for all hubs of a particular hub rim radius $R_1$, and accordingly, the radius $R_2$ of the well periphery 30 is similarly constant for all hub rims of similar radius $R_1$. The values of $R_0$ and $R_2$ are stored in memory for hubs of different radii $R_1$. These are stored in a look up table in memory in the computer 60 so that the microprocessor 60, on determining the radius $R_2$ of the well periphery 30, can look up the appropriate value of $R_0$. The microprocessor 60 adds the appropriate value of $R_0$ to the value of $R_2$ to obtain the radius $R_1$ of the rim 15 of the hub 10.

Since the ultrasonic transducer 26 is positioned advanced of the transducer 27, the transducer 26 detects the periphery 30 of the hub well 31 first. The angular position of the framework 17 detected by the transducer 28 at which the periphery 30 is detected by the transducer 26 is stored in memory. Further downward movement of the framework 17 over the wheel 9 brings the transducer 27 into alignment with the periphery 30 of the wheel well 31. Provided the transducer 27 detects the periphery 30 in a similar position allowing for the 10 mm offset between the two transducers 26 and 27, and within certain predetermined tolerance limits, the position of the periphery 30 is confirmed.

The microprocessor 60 of the wheel balancing apparatus 1 under the control of the software determines the radius $R_2$ from the angular readings of the transducer 28 when the transducers 26 and 27 detected the periphery 30. The radius $R_1$ is then computed by adding the appropriate value of $R_0$ to $R_2$. The angular positions of the transducers 26 and 27 which would correspond to the radius of the side walls 12 and 13 adjacent the rim 15, namely a radius just less than the radius $R_1$, is then determined. The distances x and y of the transducers 26 and 27 from the wheel 9 stored against these particular angular values are read from the memory. The distances of the inside side wall 12 and outside side wall 13 of the hub 10 adjacent the rim 15 from the reference plane 18 are computed from the looked up values using the formulae $$b_1 - x_1,$$

$$b_2 - y_1, \text{respectively}.$$

The width a of the hub 10 from the outer surfaces 37 of the side walls 12 and 13 adjacent the rim 15 is determined from the looked up values using the formula $$a = c - x_1 - y_1$$

where $x_1$ and $y_1$ are the distances of the inside side wall 12 and outside side wall 13 adjacent the rim 15 from the transducers 26 and 27 respectively, see FIG. 5.

In practice, the outer surfaces 37 of the inner and outer side walls 12 and 13 are substantially parallel. Thus, to obtain the values $x_1$ and $y_1$, the values of x and y corresponding to an angular position of the framework 17 which corresponds to a radius halfway between the radii $R_1$ and $R_2$ may be obtained and will give a relatively accurate value for the values $x_1$ and $y_1$.

Referring to FIG. 7, the formula used by the microprocessor 60 for determining the radius R of any point P on the wheel 9 from the rotational axis 7 of the shaft 5 is as follows:

$$R = \sqrt{(e - d\cos\theta)^2 + (d\sin\theta)^2}$$

where d and e are equal and are respectively the distances from the pivot axis 21 to either of the transducers 26 or 27, and the distance from the pivot axis 21 to the rotational axis 7 of the shaft 5, and $\theta$ is the angle which either of the transducer 26 or 27 makes with the common plane of the axes 7 and 21 about the axis 21 on detecting the point P.

The value of $\theta$ is computed by the microprocessor from the value of $\phi$ obtained from the transducer 28 when either of the transducers 26 or 27 detect the point P by making an allowance for the known angular offsets of the transducers 26 and 27 from the angle $\phi$ which the framework 17 makes with the common plane of the axes 7 and 21 about the pivot axis 21.

The outputs from the transducers 26 and 27 are calibrated by each transducer 26 and 27 taking a distance reading off the other transducer 27 and 26 respectively. These readings correspond to the distance c between the transducers 26 and 27 which is stored in memory in the microprocessor of the apparatus 1. Thus, each time the framework 17 is pivoted downwardly over a wheel to be balanced, the microprocessor 60 of the apparatus 1 takes a reading from the output of each transducer corresponding to its distance from the other transducer for calibration prior to the framework 17 passing over the wheel 9.

The distances of the transducers 26 and 27 from the reference plane 18 is periodically checked and calibrated. This is done by pivoting the framework 17 over the coupling plate 8 without a wheel being mounted thereon, and determining the distances $b_1$ and $b_2$ of the transducers 26 and 27 from the face 18 of the coupling plate 8 by taking readings from the transducers 26 and 27, on the transducer 28 giving a reading at which the transducers 26 and 27 would be aligned with the face 18 of the coupling plate 8. The new values of $b_1$ and $b_2$ are stored in the memory of the microprocessor 60 of the wheel balancer 1.

Referring now to FIG. 8 circuitry 61 associated with the transducer 26 and which connects the transducer 26 to the microprocessor 60 is illustrated. Similar circuitry is provided for the transducer 27. The circuit 61 comprises a transistor switching device 63 for switching the transducer 26 from transmit to receive. The switching device 63 is controlled by the microprocessor 60. A carrier signal generator, namely an oscillator 64 generates a carrier signal for delivery to the transducer 26 for transmission. In this case, the oscillator generates carrier signals at 200 KHz. The generated signals are delivered from the oscillator 64 through a gate 65 to an amplifier 66. The gate 65 is controlled by the microprocessor 60 through the line 72 to allow a pulse of determined length of the carrier signal through. The pulse from the gate 65 is amplified in the amplifier 66 and delivered to the transistor switch 63. The pulse signal is transmitted by the transducer 26. The transistor switch 63 is switched over by the microprocessor 60 to connect the transducer 26 to a tuned filter 67, so that the reflected signal received by the transducer 26 is fed into the tuned filter 67 which is tuned to deliver pulses at the same frequency as the carrier signal frequency, in this case 200 KHz. The filter delivers the filtered signal to an amplifier 68 where it is amplified and delivered to a signal conditioning unit 69. The conditioned signal is then delivered to a demodulation unit 70 which removes the carrier frequency, thus delivering a pulse to a delay measurement unit 71. The delay measuring unit 71 comprises a timing circuit (not shown) which times the time between the pulse signal being transmitted and it being received. The timing circuit in the unit 71 is activated to commence timing when a signal from the microprocessor appears on the line 72 to open the gate 65. The timer stops timing when a pulse is received from the demodulation unit 70. The time recorded by the unit 71 is read by the microprocessor 60 on the line 74. The distance of the wheel surface from which the signal was reflected to the transducer is then computed by the microprocessor 60 from the time value. This thus gives the value of x. This value of x is stored in memory of the microprocessor 60 against the corresponding value of $\phi$. Values of y and $\phi$ are similarly computed and stored.

In use, with the framework 17 in its raised position illustrated in FIG. 1, the wheel 9 is mounted co-axially on the coupling plate 8 of the shaft 5. The wheel 9 is rotated by hand. The framework 17 is then pivoted downwardly in the direction of the arrow A to the position illustrated in FIG. 2. As the framework 17 pivots downwardly, the radius $R_1$ of the rim 15 of the hub 10 and the distances $x_1$ and $y_1$ of the outer surfaces 37 of the inside side wall 12 and outside side wall 13 of the hub 10 from the reference plane 18 as well as the width a of the hub 10 across the side walls 12 and 13 adjacent the rim 15 are determined as already described. These values are stored in the memory of the microprocessor 60 of the wheel balancer 1. As the wheel 9 rotates, the imbalance of the wheel is determined, the stored values of $R_1$, $x_1$ and $y_1$ are used by the microprocessor in computing the size of the weights for the inside and outside positions on the rim 15 under the control of the software. The values of the weights and their angular positions are displayed on the visual display 14.

It will therefore be appreciated that by using the apparatus 16 according to the invention, there is no longer any need for the operator of the wheel balancer 1 to input manually any data into the apparatus 1. Thus, the apparatus according to the invention substantially eliminates operator error, and furthermore substantially reduces the labor required to operate the wheel balancer 1.

Figure 9:
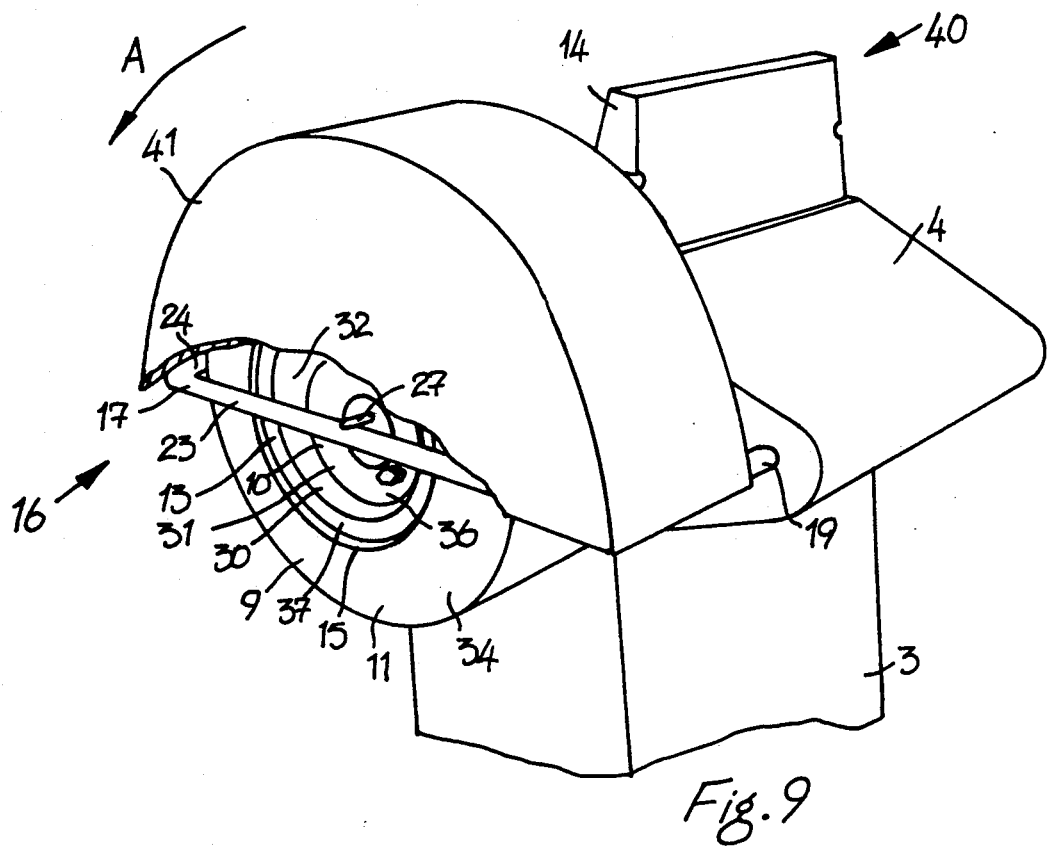
FIG. 9 is a perspective view of wheel balancing apparatus according to another embodiment of the invention.

Referring now to FIG. 9 there is illustrated a wheel balancer according to another embodiment of the invention indicated generally by the reference numeral 40. This wheel balancer 40 is substantially similar to that just described, and similar components are identified by the same reference numerals. In this case, the wheel support shaft is driven by a motor (not shown) and a hood 41 is provided over the framework 17. A relay (not shown) which activates the drive motor of the wheel support shaft is activated by the hood as it is pivoted downwardly in the direction of the arrow A. Thus, in use, as the hood 41 and framework 17 are pivoted downwardly in the direction of the arrow A, the wheel support shaft drive motor is activated, thereby rotating the wheel 9. Further downward pivoting of the hood 40 over the wheel 9 causes the transducers 26 and 27 to pass over portion of the respective sides 33 and 34 of the wheel 9 as in the case of the apparatus 1. Otherwise, the apparatus 40 is similar to that of the apparatus 1.

Referring now to FIGS. 10 to 13, there is illustrated a framework 50 of apparatus according to another embodiment of the invention also for mounting on a wheel balancer, such as the wheel balancer 1 for determing the hub rim radius $R_1$ and the distances of the outer surfaces 37 of the side walls 12 and 13 of the hub 10 adjacent the rim 15 from a reference plane of the wheel balancer. This apparatus is substantially similar to the apparatus 16, and only the framework 50 is illustrated. The framework 50 is substantially similar to the framework 17 and similar components are identified by the same reference numerals. In this case, the ultrasonic transducers 26 and 27 which are ultra sonic transducers similar to the transducers 26 and 27 on the framework 17 are mounted on the side members 22 and 23 respectively but towards the cross member 24. However, the transducers 26 and 27 are directed so that the signal transmitted by the two transducers 26 and 27 are directed substantially parallel to the side members 22 and 23. Focusing means, in this case provided by focusing mirrors 53 and 54 on the side members 22 and 23 respectively, direct the signals illustrated by broken lines 55 from the transducers 26 and 27 substantially parallel to the rotational axis 7 of the wheel balancer 1 and substantially perpendicular to the reference plane 18 towards the wheel 9. In this case, the focusing mirrors 53 and 54 are concave and circular having a diameter of approximately 6.35 mm and a radius r of curvature of approximately 35.56 mm. The mirrors 53 and 54 are mounted at an angle of 45° to the side members 22 and 23. The transducer 26 is mounted towards the bottom of the side member 22 as is the corresponding mirror 53, while the transducer 27 is mounted towards the top of the side member 23 as is the mirror 54. This thus gives the offset f. In this particular embodiment of the invention, the focusing mirrors 53 and 54 form the predetermined position from which the signals are transmitted from the side members 22 and 23 towards the wheel 9. Further, the focusing mirrors 53 and 54 also determine the angle at which the signal is directed from the side members 22 and 23.

The framework 50 is pivotally mounted on the wheel balancing apparatus 1 by the pivot member 19 in similar fashion to the framework 17 and accordingly operation of the framework 50 is similar to that of the framework 17. However, by virtue of the fact that focusing mirrors 53 and 54 are used to focus the signals 55 from the transducers 26 and 27 and in turn the reflected signal from the wheel, two advantages are achieved. Firstly, the focused signals give a more precise reading than unfocused signals, and secondly, the distance travelled by the transmitted and reflected signals to and from the transducers 26 and 27 is greater than in the case of the transducers 26 and 27 of the framework 17 and this further gives more accurate results and also facilitates handling of the received signals from the transducers 26 and 27 by the circuitry of FIG. 8.

While in the embodiment of the invention described with reference to FIGS. 1 to 8, the distances stored against corresponding angles 5 of the framework 17 have been the distances x and y of the transducers 26 and 27 from the sides 33 and 34 of the wheel 9, it will be appreciated that any distances may be stored. Indeed, it is envisaged in many cases that the distances stored may be the distances of the sides 33 and 34 of the wheel 9 from the reference plane 18.

Furthermore, it is envisaged that in many cases instead of, and in many cases as well as, storing the distances x and y against the different angles $\phi$ of the framework, a cross sectional profile of a section through the wheel 9 may be computed. In general, it is envisaged that the cross sectional profile would at least include portion of the hub well and would extend through the side walls 12 and 13 of the hub to at least the rims 15 of the side walls 12 and 13. The storing means would store a plurality of known cross sectional profiles of reference hubs and/or wheels, and the computed profile would be compared with the stored profiles to determine the type of hub on the wheel balancer. Knowing the type of hub, the hub rim radius and the width of the hub across the outer surfaces of the inner and outer side walls could then be readily easily looked up against data stored on the reference hubs. Thus, by knowing the distance of one or other side wall from the reference plane, the distance of the other side wall could readily easily be computed from the width of the hub 10 across the side walls 12 and 13. In such cases, where the profile of the wheel in the wheel balancer is computed and compared with reference profiles, it is envisaged that the profiles would be compared using suitable curve fitting techniques. These will be well known to those skilled in the art.

While the apparatus according to the invention mounted on the wheel balancer has been described for determining the radius of the hub rim and the distances of the side walls of the hub adjacent the rim from the reference plane, the apparatus could be used to determine the radius of any characteristic on the hub and its distance from the reference plane. It will be appreciated that where a balance weight receiving location of the hub is at a position different than the rim, then the apparatus will determine the radius of that location from the rotational axis of the wheel and will also determine the distance of that location from the reference plane. Where two locations are to be provided, both of different radii and different distances, the apparatus will compute the two radii and the two distances from the reference plane.

It is also envisaged that in certain cases the apparatus according to the invention mounted on the wheel balancer may be used for determining the distance or distances only of a characteristic or characteristics of a wheel or other rotatable member from a reference plane. For example, in certain cases, it is envisaged that the radius of the hub rim may be entered manually into the wheel balancer or into the apparatus, for example by keying in the radius, and in which case the apparatus would then determine the distance of the outer surfaces of the side walls from the reference plane. In this way, once the radius of the rim is known, it would only be necessary for the ultrasonic transducers to commence scanning when the framework reaches the position appropriate to the keyed in radius of the rim.

Needless to say, in other cases, a radius other than the radius of the rim may be keyed in and the apparatus would determine the distance of the sides of the wheel from the reference plane at that radius. Indeed, in other cases, it is envisaged that by keying in the radius of the hub rim, the computing means of the apparatus by adding a known constant to the keyed in radius could cause the apparatus to determine the distances of the side or sides of the wheel or balance weight receiving locations from a reference plane at a different radius than that keyed in.

It will of course be appreciated that in many cases in determining the distance of the balance receiving location from a reference plane, the apparatus may add a constant equivalent to half the width of the balance weight onto the distances of the side walls of the hub from the reference plane to achieve an even more accurate result. In certain cases, the apparatus may subtract a constant equivalent to half the width of the balance weight from the distance of one or other of the side walls from the reference plane, depending on the position of the reference plane relative to the particular side wall or side walls. This, of course, will be well known and understood by those skilled in the art.

Likewise, a constant may be added to or subtracted from the computed radius to compensate for the thickness of the balance weight. For example, where the weight is clipped on to the rim, the centre of the weight would not directly co-incide with the radius of the rim. Rather, to achieve a particularly accurate result, it would be necessary to deduct a constant from the rim radius to obtain the radius of the point through which the weight of the balance weight acted as the wheel rotated. In general, it is envisaged that by deducting half the thickness of the weight from the computed rim radius, an accurate radius for the point through which the weight of the balance weight acted would be obtained.

It will of course be appreciated that should it be desired for any reason to determine the outer radius of the tire 11 this can readily easily be done using the readings from the transducers 26, 27 and 28. The ground engaging surface of the tire is detected by the transducers 26 and 27 by detecting the outer periphery of the side walls of the tire 11. The radius of the ground engaging surface is then determined from the angle $\phi$ read from the transducer 28 which either of the transducers 26 and 27 make with the common plane of the axes 7 and 27 using the formula discussed with reference to FIG. 7.

While particular forms of calibration have been described for calibrating the apparatus 16, any other suitable means of calibration could be used. For example, in many cases, it is envisaged that calibration won't take place each time the framework is pivoted downwardly, and other suitable forms of calibration of the apparatus relative to the reference plane may also be used.

It will be appreciated that while the apparatus 16 according to the invention has been described as being mounted on the wheel balancer 1 of FIGS. 1 to 8 in which the wheel 9 and accordingly shaft 5 is rotated by hand, the apparatus 16 could be used with any type of wheel balancer. The wheel balancer 1 may be of the type where the wheel support shaft is motor driven. Further, it will be appreciated that other construction of apparatus 16 could be used without departing from the scope of the invention. For example, it will be appreciated that the ultrasonic transducers may be mounted on any suitable mounting means besides a framework. Any suitable member, housing, frame or the like may be used. Indeed, it will be readily appreciated that it is not necessary for the framework 17 to be pivoted, it could be linearly movable upwardly or downwardly or from side to side, or indeed at any angle to traverse the ultrasonic transducers over the sides of the wheel.

Indeed, once the relative position of the ultrasonic transducer relative to the rotational axis of the wheel is known, the radial position of the transducer can be determined.

Further, it is not necessary that the sensing means should move radially relative to the rotational axis of the wheel.

Further, it will be appreciated that while two ultrasonic transducers have been described, namely one on each side of the wheel, one transducer is all that is necessary for the invention. The radial position of any point P on a wheel or any member can be readily easily determined by a single transducer, and in certain cases the distances of the inside and outside of the wheel or hub from a reference plane may be determined by a single transducer. Indeed, it will be appreciated that the transducers 26 and 27 could if desired be aligned with each other rather than one being advanced relative to the other.

It is envisaged that the width of the wheel, and/or the width at the hub adjacent the hub rim could also be determined using a single ultra sonic or other type of transducer by providing suitable reflectors to give multiple reflections.

It is envisaged that sensing means other than ultrasonic transducers may be provided. Indeed, the sensing means may be provided by any other suitable type of transducer, for example, an infra red transducer, laser transducer, a visible light transducer, magnetic transducer or the like.

Similarly, other suitable transducers besides the transducer described for measuring the angle of rotation of the pivot member 19 may be used without departing from the scope of the invention.

Further, it is envisaged that readings of the distances x and y may be taken at any desired angular intervals other than 2°. Needless to say, for more precise results, the readings should be taken at smaller angular intervals.

In certain cases, it is envisaged that instead of taking the readings of the distances x and y at angular intervals, they could be taken at predetermined time intervals, in which case corresponding readings from the three transducers 26, 27 and 28 would be taken and stored.

It is envisaged that suitable drive means, for example a motor or any other suitable drive could be provided for pivoting the framework 16 in the direction of the arrow A over the wheel and also in the return direction.

Further, it is envisaged that the wheel support shaft of the apparatus described with reference to FIGS. 1 to 8 could similarly if desired be driven by a drive motor, and if desired, the apparatus of FIG. 9 could be provided by a manually rotatable wheel support shaft.

While specific dimensions have been given in the description, any other dimensions could be used without departing from the scope of the invention. While the offset f between the transducers 26 and 27 has been described as being of 10 mm, it may be greater or less. Indeed, as mentioned above, the two transducers 26 and 27 may be completely aligned with each other. Alternatively, if desired the transducer 27 may be advanced of the transducer 26.

Further, the apparatus could be used for balancing wheels of any diameter from the smallest up to and larger than aircraft wheels, and of any other shape and construction besides the wheel just described.

While a particular logic circuit has been described for dealing with the signals transmitted and received by the transducers 26 and 27, any other suitable logic circuitry could be used without departing from the scope of the invention.

While the transducers have been described as comprising a separate transmitter and receiver, in certain cases it is envisaged that each transducer will comprise a single internal unit which will act as a receiver and transmitter.

While the apparatus according to the invention has been described for measuring the radius of the rim of a hub of a vehicle wheel and the distance of the side walls of the hub adjacent the rim from a reference plane, the apparatus could be used for determining the radial distance of any point on a rotatable member relative to its rotational axis. Further, the apparatus could be used for determining the width of any rotatable member or the width of any rotatable member at a particular point or position and/or the distance of any point on a rotatable member from a reference plane.

While a specific method for determining the radius of the hub rim of the vehicle wheel has been described, other methods could be used without departing from the scope of the invention. For example, in certain cases, it is envisaged that instead of the sensing means determining the position of the periphery of the hub well and then computing the hub rim radius from this value using look up tables, in certain cases it is envisaged that by using sufficiently sensitive sensing means, the apparatus may directly detect and determine the radius of the hub rim. Needless to say, other positions of the wheel or tire may be used, and indeed it will be appreciated that all that is required is for the apparatus to be able to detect a step change in the distance of the wheel surface from the sensing means, or alternatively, to compute a cross sectional profile of the hub.

Needless to say, it will be appreciated that the apparatus may be used for detemining the radius and distance from a reference plane of a balance weight receiving location, where the balance weight is to be attached, for example, by adhesive to the periphery of the hub well formed by the hoop 32 of the hub 10.

While in this particular embodiment of the invention, the apparatus has been used to determine the width of the hub, it will be readily apparent to those skilled in the art that it is not essential that the width of the hub should be determined. Once the distances of the inside and outside walls of the hub from a reference plane have been determined and the radius of the hub rim has been determined that is all that is necessary for automatic operation of the wheel balancer. Indeed, in certain cases, it is envisged that only the distance of one side wall, for example the inside side wall of the hub may be determined from a reference plane, and in which case the width of the hub would then be determined and inputted from the apparatus 16 into the wheel balancer 1. The wheel balancer 1 could then determine the distance of the other, namely the outside side wall from the reference plane.

We claim:

1. Apparatus for determining the radial distance of a balance weight receiving location from the rotational axis of a vehicle wheel and for determining the distance of the balance weight receiving location from a reference plane, the apparatus comprising:

a housing;

receiving means mounted on the housing for receiving the wheel, the receiving means defining the rotational axis of the wheel;

a mounting means movable relative to the housing;

sensing means for transmitting and receiving a signal for detecting the wheel and a characteristic of the wheel, the sensing means being mounted on the mounting means so that on movement of the mounting means relative to the housing, the signal of the sensing means is directed towards and moves over portion of a radial side face of the wheel;

detecting means for detecting the position of the mounting means relative to the housing; and computing means for storing reference parameters of reference vehicle wheels, and for computing corresponding parameters of the vehicle wheel from the signals received by the sensing means and detecting means, and for comparing the parameters of the vehicle wheel with the reference parameters of the reference wheels for determining the radius of the balance weight receiving location from the rotational axis of the wheel and for determining the distance of the balance weight receiving location from the reference plane.

2. Apparatus for locating a characteristic on a radial side face of a vehicle wheel, the vehicle wheel defining a rotational axis, and for determining the radial distance of the characteristic from the rotational axis of the wheel, and the distance of the characteristic from a reference plane which extends transversely of the rotational axis of the wheel, the apparatus comprising:

a housing;

receiving means mounted on the housing for receiving the wheel, the receiving means defining the rotational axis of the wheel;

a mounting means movable relative to the housing, and constrained to move in a predetermined path relative to the housing;

sensing means for transmitting and receiving a measuring signal for detecting the wheel and the characteristic, the sensing means being mounted on the mounting means at a predetermined position relative to the predetermined path, and being arranged so that on movement of the mounting means relative to the housing, the measuring signal of the sensing means is directed towards and moves over a portion of the radial side face of the wheel;

detecting means for detecting the position of the mounting means relative to the housing; and computing means for computing the radial distance of the characteristic from the rotational axis, and the distance of the characteristic from the reference plane based upon output signals received from the sensing means and the detecting means.

3. Apparatus as claimed in claim 2, wherein said sensing means comprises a pair of sensors, said sensors being mounted on the mounting means at first and second predetermined positions respectively so that on movement of the mounting means the measuring signals of said sensors move over portion of respective opposite radial side faces of the wheel.

4. Apparatus as claimed in claim 3, in which the detecting means comprises a transducer for monitoring the position of the mounting means, and each sensor is an ultrasonic sensor having an ultrasonic transmitter and receiver contained therein.

5. Apparatus as claimed in claim 3, in which the mounting means is provided by a framework having a pair of spaced apart side members, which in use receive portion of the wheel therebetween, the predetermined position of the sensing means being fixed relative to the respective side members of the framework.

6. Apparatus as claimed in claim 5, in which the predetermined positions of the sensors are provided on respective side members substantially opposing each other, the signal of each sensor being transmitted in a direction substantially parallel to the rotational axis of the wheel, the predetermined path through which the framework is constrained to move is substantially a radial path in a direction towards the rotational axis of the wheel.

7. Apparatus as claimed in claim 6, in which one of said first and second predetermined positions is slightly advanced of the other in the direction of motion of the framework towards the rotational axis of the wheel.

8. Apparatus as claimed in claim 2, in which the mounting means is pivotally mounted about a pivot axis, the pivot axis being parallel to and spaced apart from the rotational axis of the wheel, the pivot axis and rotational axis together defining a common plane.

9. Apparatus as claimed in claim 2, in which the computing means stores distances of each side face of the wheel from the reference plane against corresponding positions of the mounting means at predetermined intervals of movement of the mounting means.

10. Apparatus as claimed in claim 2, in which the computing means stores reference parameters of reference vehicle wheels, and computes corresponding parameters of the vehicle wheel from the signals received by the sensing means and detecting means, and compares the parameters of the vehicle wheel with the reference parameters of the reference vehicle wheels.

11. Apparatus as claimed in claim 10, in which the computing means computes the radial distance of a balance weight receiving location from the rotational axis of the vehicle wheel and the distance of the balance weight receiving location from the reference plane.

12. Apparatus as claimed in claim 10, in which the computing means stores respective cross-sectional profiles of at least a portion of the reference vehicle wheels, and the computing means computes a profile of said portion of the vehicle wheel and compares the computed profile with the profiles of the reference vehicle wheels for determining at least the radius of the balance weight receiving location of the vehicle wheel.

13. Apparatus as claimed in claim 12, in which the sensing means detects the periphery of a well of a hub of the vehicle wheel, and the computing means stores distances relating to the surface of the radial side face of the vehicle wheel against corresponding values of radii at intervals on movement of the mounting means, and the computing means computes the radius of the periphery of the well of the hub based upon the signals received from the sensing means and the detecting means, and adds a predetermined distance to the computed value of the radius of the periphery of the well for determining the radius of the balance weight receiving location, and looks up a stored value of distance of the surface of the radial side face of the vehicle wheel from the reference plane, corresponding to the radius of the balance weight receiving location.

14. Apparatus as claimed in claim 11, in which the radius and distance of balance weight receiving locations on each side of the wheel are determined by the computing means, the radius of each balance weight receiving location being the radius of a rim of the hub and the distance of each balance weight receiving location being the distance of a respective side wall of the hub adjacent the rim from the reference plane.

15. Apparatus for determining the radial distance of a balance weight receiving location from the rotational axis of a vehicle wheel and for determining the distance of the balance weight receiving location from a reference plane which extends transversely of the rotational axis of the wheel, the apparatus comprising:

a housing;

receiving means mounted on the housing for receiving the wheel, the receiving means defining the rotational axis of the wheel;

a mounting means movable relative to the housing, and constrained to move in a predetermined path relative to the housing;

sensing means for transmitting and receiving a measuring signal for determining the balance weight receiving location of the wheel, the sensing means being mounted on the mounting means at a predetermined position relative to the predetermined path, and being arranged so that on movement of the mounting means relative to the housing, the measuring signal of the sensing means is directed towards and moves over portion of a radial side face of the wheel;

detecting means for detecting the position of the mounting means relative to the housing; and computing means for storing reference parameters of reference vehicle wheels, and for computing corresponding parameters of the vehicle wheel based upon output signals received by the sensing means and detecting means, and for comparing the parameters of the vehicle with the reference parameters of the reference wheels for determining the radius of the balance weight receiving location from the rotational axis of the wheel and for determining the distance of the balance weight receiving location from the reference plane.

16. Wheel balancing apparatus comprising:

a housing;

a receiving means comprising a shaft rotatably mounted in the housing for receiving a wheel to be balanced, and defining the rotational axis of the wheel; and locating means for locating a characteristic on a radial side face of the wheel, and for determining the radial distance of the characteristic from the rotational axis of the wheel, and the distance of the characteristic from a reference plane which extends transversely of the rotational axis of the wheel, the locating means comprising:

mounting means movable relative to the housing, and constrained to move in a predetermined path relative to the housing;

sensing means for transmitting and receiving a signal for detecting the wheel and the characteristic, the sensing means being mounted on the mounting means at a predetermined position relative to the predetermined path, and being arranged so that on movement of the mounting means relative to the housing, the signal of the sensing means is directed towards, and moves over portion of, a radial side face of the wheel;

detecting means for detecting a position of the mounting means relative to the housing;

computing means for computing the radial distance of the characteristic from the rotational axis, and the distance of the characteristic from the reference plane based upon output signals received from the sensing means and the detecting means; and means for determining the imbalance of the wheel operatively connected to said computing means.

17. A method for locating a characteristic of a radial side face of a vehicle wheel, the vehicle wheel defining a rotational axis, and for determining the radial distance of the characteristic from the rotational axis of the wheel, and the distance of the characteristic from a reference plane which extends transversely to the rotational axis of the wheel, the method comprising the steps of:

mounting the wheel on a receiving means, which is axially fixed to a housing and rotatable about the rotational axis;

transmitting and receiving a measuring signal from a sensing means;

moving a mounting means relative to the housing to cause the signal from the sensing means, mounted on the mounting means, to move over a radial side face of at least a portion of the wheel for detecting the characteristic; and computing a radial distance of the characteristic from the rotational axis, and the distance of the characteristic from the reference plane based upon output signals received from the sensing means and a detecting means which detects a position of the mounting means.

18. A method for determining the radius of a balance weight receiving location of a vehicle wheel from the rotational axis of the wheel and for determining the distance of the balance weight receiving location from a reference plane, the method comprising the steps of:

transmitting and receiving a measuring signal from a sensing means;

moving a mounting means so that the signal from the sensing means, mounted thereon, moves over at least a portion of a radial side face of a hub of the wheel;

recording and storing the distances of the surface of portion of the radial side face of the hub from the reference plane against the corresponding positions of the mounting means at a plurality of different positions of the mounting means at intervals as the mounting means is moved;

comparing at least one of the stored values against reference parameters of reference wheels for determining the type of wheel; and determining the radius of the balance weight receiving location and the distance of the location from the reference plane from at least one of the stored values.

19. A method as claimed in claim 18, further comprising the steps of:

computing a profile of a cross section of at least a portion of the wheel and comparing the profile with corresponding profiles of reference vehicle wheels to determine the type of wheel, the profile computed comprising a profile of a section of the wheel hub adjacent the well periphery of the hub; and computing the radius of at least one balance weight receiving location and the distance of the at least one balance weight receiving locations.

20. A method as claimed in claim 18, further comprising the steps of:

computing the radius of the periphery of the hub well based upon output signals received from the sensing means and detecting means when the sensing means detects a relatively large change in distance of the outer surface of a radial side face of the hub from the reference plane;

adding a predetermined distance, corresponding to the difference between a rim radius of the hub and a well peripheral radius, to the well peripheral radius to provide the radius of the hub rim; and looking up the stored values of the distances of the surface of the radial side faces of the wheel from the reference plane corresponding to a radius of the side wall adjacent the hub rim.

* * * * *